Patented Jan. 5, 1943

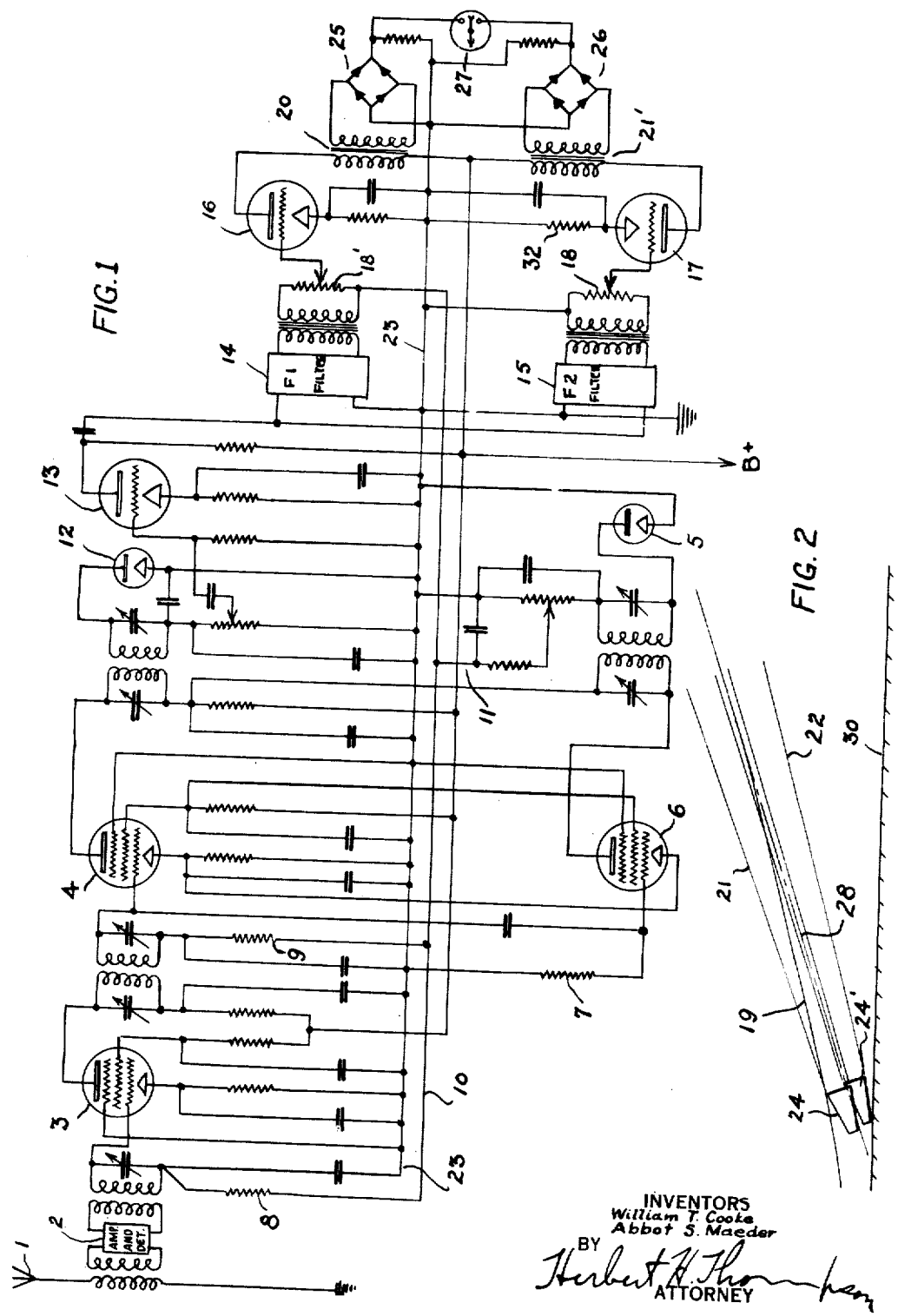

2,307,023

UNITED STATES PATENT OFFICE 2,307,023

METHOD AND APPARATUS FOR LANDING AIRCRAFT

William T. Cooke and Abbott S. Maeder, Palo Alto, Calif., assignors to Sperry Gyroscope Company, Inc., Brooklyn, N. Y., a corporation of New York Application August 28, 1940, Serial No. 354,498

6 Claims. (Cl. 250—11)

This invention relates, generally, to the blind landing of aircraft, and the invention has reference, more particularly, to a novel method and means including an automatic ratio control signal receiver for use in connection with overlapping radio beams for effecting the blind landing of aircraft, the receiver serving to differentially amplify the signals of the radio beams, whereby a desired artificial guide path is obtained.

Ultra high frequency directive radio beams of the order of $10^8$ cycles per second are employed in the blind landing apparatus of this invention. The beams used, for example, may be differently modulated and provide an overlapping zone or guide path down which the aircraft flies during landing. At these high frequencies the guide path provided by the beams is substantially straight, so that if the craft follows the beam path all the way down, there is a tendency for the craft to fly into the ground. It is desirable, of course, to provide a straight guide path for the major portion of the landing operation, but just before the craft reaches the ground it is preferable to flatten or curve the glide so that the craft will land smoothly.

The principal object of the present invention is to provide a novel method and means for effecting the blind landing of aircraft which provides a substantially straight glide path for the greater part of the landing operation and with the path altered prior to landing to afford optimum landing conditions.

Another object of the present invention is to provide a novel ultra high frequency signal control receiver that serves to automatically flatten out or otherwise vary the glide path for the craft as the landing point is approached to thereby obtain optimum landing conditions, this being accomplished by automatically changing the amplification ratio of the two overlapping transmitted glide path signals at the receiver.

Other objects and advantages will become apparent from the specification, taken in connection with the accompanying drawing wherein one embodiment of the invention is illustrated.

In the drawing,

Fig. 1 is a wiring diagram of the novel receiver of this invention, and

Fig. 2 is a schematic view of the apparatus of this invention providing an artificial landing path.

Referring now to the drawing illustrating the invention, the reference numeral 1 designates a receiving antenna carried by the aircraft, which antenna feeds into an ultra high frequency radio amplifier and detector 2. In the amplifier and detector 2 the ultra high frequency modulated signals, received from the overlapping landing beams 21 and 22 (Fig. 2) that have different modulating frequencies F1 and F2, are superimposed upon a suitable carrier or locally generated frequency and then detected to produce an intermediate frequency signal which is supplied to the intermediate frequency amplifier shown as consisting of two stages 3 and 4. Automatic volume control bias is supplied to amplifier stages 3 and 4 from the AVC detector 5 which is supplied from the intermediate frequency amplifier 6 operating at a constant gain. This will be understood when it is noted that the bias on the control grid of tube 6 is determined by resistance 7 inserted between this grid and ground line 23, whereas the bias on the control grids of tubes 3 and 4 is determined by resistances 8 and 9 connected to the AVC line 10, the potential of which is determined by lead 11 connected to the filtered output of AVC detector or diode rectifier 5.

The output of the intermediate frequency amplifier 4 is detected by a second detector 12 and further amplified by a tube 13, the output of which supplies band pass filters 14 and 15, respectively, passing frequencies F1 and F2, which select the respective modulations of the two overlapping beams. The automatic volume control line 10 is also connected to the control grid of audio amplifier 16, whereby the automatic volume control bias controls the gain of this amplifier which amplifies the signal of one beam, such as that transmitted by one radiating horn or emitter 24. The audio amplifier 17 amplifies the signal supplied from filter 15, i. e., the signal of the other beam transmitted from horn or emitter 24', and this amplifier 17 operates at constant gain since the bias on its grid is determined by resistance 32 connected to the ground lead 23. The outputs of the tubes 16 and 17 are connected in opposition and pass through audio transformers 20 and 21' and through copper oxide rectifiers 25 and 26 for application to the up-down or zero center microammeter 27.

The operation of the system of this invention in providing an artificial glide path that is variable at will by varying the AVC will be understood from Fig. 2. In this figure, the overlapping beams 21 and 22 provide a glide path indicated by the dotted line 28, i. e., a straight glide path down which the craft would normally fly to earth 30. In using the novel receiver of this invention, however, and assuming it is desired to flatten out the glide path just before landing to prevent flying the craft into the ground, the detected modulation F1 of the upper beam 21 is amplified by the tube 16 having AVC bias thereon whereas the F2 signal of the lower beam 22 is amplified by tube 17 operating at constant gain. Thus, the signal of the upper beam is weakened relative to that of the lower beam and in order to fly in an equisignal region, the pilot must alter his course as shown by the solid line 19, thereby automatically flattening his glide to provide a normal landing. Although, in the example given the effective glide path is raised as the craft approaches a landing, this path could be lowered if desired.

The glide angle, i. e., the angle between line 28 and the ground 30 may be changed, if desired, by adjusting the manual ratio potentiometer controls 18 and 18'.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described our invention what we claim and desire to secure by Letters Patent is:

1. In apparatus for landing aircraft, ultra high frequency radio projecting means in the region of the landing area producing overlapping beams of electromagnetic energy, means for modulating said beams at different frequencies, a receiver carried by the aircraft, said receiver comprising different amplifiers for amplifying the different modulations of the beams, and means controlled by the strength of the received energy for varying the amplification ratio between said different amplifiers, thereby providing a glide path that varies from a straight line as the landing area is approached.

2. In apparatus for landing aircraft, ultra high frequency radio projecting means in the region of the landing area producing overlapping beams of differently modulated electromagnetic energy, and a receiver carried by the aircraft, said receiver comprising amplifiers for amplifying the modulations of the beams, and an automatic volume control detector circuit connected for limiting the gain of an amplifier of one of said modulations, the amplifier of the other modulation operating at substantially constant gain to obtain dissimilar amplifications of said modulations and hence a glide path departing from a straight line.

3. A method of landing aircraft blind comprising, projecting overlapping beams of differently modulated ultra high frequency electromagnetic energy, receiving the beam signals on the aircraft, detecting said signals, amplifying said detected signals by different amounts, one of said signals being amplified at constant gain and the other at a variable gain dependent on the strength of such signal, rectifying said thusly amplified signals, and flying the aircraft such that the rectified signals are equal.

4. An ultra high frequency receiver for aircraft in effecting blind landings comprising, means for superimposing received ultra high frequency signals upon a locally generated frequency and for detecting said signals to produce intermediate frequency signals, an automatic volume control amplifier connected for amplifying said signals, an intermediate frequency detector connected for detecting said intermediate frequency signals, audio amplifiers connected for amplifying said detected signals, and means for varying the ratio of the gains of the audio amplifiers in accordance with the strength of the received signals, and means for indicating the difference in the relative strengths of said amplified modulations.

5. An ultra high frequency receiver for aircraft in effecting blind landings comprising, means for amplifying the received differently modulated signals, detecting said signals, automatic volume control means, amplifiers for amplifying said respective modulations, one of said amplifiers being controlled from said automatic volume control means so that said modulations are amplified in different ratios depending upon the strength of the received signals, rectifier means for rectifying said amplified modulations, and means for comparing the relative strengths of said rectified modulations.

6. In an apparatus for landing aircraft, ultra high frequency radio projecting means in the region of the landing area producing overlapping beams of differently modulated electromagnetic energy, means on the aircraft for receiving said differently modulated energy, means for detecting said received energy to obtain the modulations therefrom, means for separating said modulations, means for amplifying one of said modulations at constant gain and the other at varying gain depending on the strength of such modulation, and indicator means supplied with said amplified modulations in opposition.

WILLIAM T. COOKE.
ABBOTT S. MAEDER.